US012626652B2

(12) United States Patent
Song et al.

(10) Patent No.: US 12,626,652 B2
(45) Date of Patent: May 12, 2026

(54) GATE DRIVER AND DISPLAY APPARATUS INCLUDING THE SAME

(71) Applicant: Samsung Display Co., LTD., Yongin-si (KR)

(72) Inventors: Hyungjin Song, Yongin-si (KR); Nackhyeon Keum, Yongin-si (KR); Kwangsae Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/037,156

(22) Filed: Jan. 25, 2025

(65) Prior Publication Data

US 2025/0316218 A1 Oct. 9, 2025

(30) Foreign Application Priority Data

Apr. 9, 2024 (KR) ........................ 10-2024-0047848

(51) Int. Cl.
*G09G 3/32* (2016.01)

(52) U.S. Cl.
CPC ....... *G09G 3/32* (2013.01); *G09G 2300/0408* (2013.01); *G09G 2300/0852* (2013.01); *G09G 2310/0286* (2013.01); *G09G 2310/061* (2013.01)

(58) Field of Classification Search
CPC ... G09G 3/32–3291; G09G 2310/0286; G09G 2310/061–063; G09G 2340/16; G09G 3/3233; G09G 3/3258; G09G 3/3677; G09G 2300/0408; G09G 2300/0852; G09G 2310/0267; G09G 2310/0426; G09G 2310/08; G09G 2320/0214; G11C 19/28–287
See application file for complete search history.

(56) References Cited

U.S. PATENT DOCUMENTS

2023/0081076 A1* 3/2023 Lim ..................... G09G 3/3688 345/212
2024/0185937 A1* 6/2024 Shang .................. G09G 3/3674

FOREIGN PATENT DOCUMENTS

KR 1020210083120 A 7/2021
KR 20230112241 A * 7/2023 ........... H10D 86/441
KR 1020230112241 A 7/2023

* cited by examiner

*Primary Examiner* — Amr A Awad
*Assistant Examiner* — Aaron Midkiff
(74) *Attorney, Agent, or Firm* — CANTOR COLBURN LLP

(57) ABSTRACT

A gate driver includes a plurality of stages. A stage of the stages includes a pull-up circuit which applies a high voltage to an output node which outputs a gate signal, a pull-down circuit which applies a low voltage lower than the high voltage to the output node, a gate signal control circuit which controls the pull-up circuit and the pull-down circuit, and a stabilization transistor connected to the pull-down circuit. The stabilization transistor is turned off when the gate signal has the low voltage.

14 Claims, 12 Drawing Sheets

GATE DRIVER AND DISPLAY APPARATUS INCLUDING THE SAME

This application claims priority to Korean Patent Application No. 10-2024-0047848, filed on Apr. 9, 2024, and all the benefits accruing therefrom under 35 U.S.C. § 119, the content of which in its entirety is herein incorporated by reference.

BACKGROUND

1. Field

Embodiments of the invention relate to a gate driver and a display apparatus including the gate driver. More particularly, embodiments of the invention relate to a gate driver with improved output stability and a display apparatus including the gate driver.

2. Description of the Related Art

Generally, a display apparatus includes a display panel and a display panel driver. The display panel includes a plurality of gate lines, a plurality of data lines and a plurality of pixels. The display panel driver includes a gate driver for providing a gate signal to the gate lines, a data driver for providing a data voltage to the data lines and a driving controller for controlling the gate driver and the data driver.

SUMMARY

In a display apparatus, an output stability of gate signal may be deteriorated by a leakage current flowing in a gate driver.

Embodiments of the invention provide a gate driver with improved output stability.

Embodiments of the invention also provide a display apparatus including the gate driver.

According to embodiments, a display apparatus includes a display panel including a pixel, a gate driver which output a gate signal to the display panel and a data driver which applies a data voltage to the display panel. In such embodiments, the gate driver includes a plurality of stages. In such embodiments, a stage of the stages includes a pull-up circuit which apply a high voltage to an output node which outputs the gate signal, a pull-down circuit which applies a low voltage lower than the high voltage to the output node, a gate signal control circuit which controls the pull-up circuit and the pull-down circuit, and a stabilization transistor connected to the pull-down circuit. In such embodiments, the pixel emits light based on the data voltage of a current frame during a first frame and emits light based on the data voltage of a previous frame during a second frame. In such embodiments, the stabilization transistor is turned off during a self-scan period included in the second frame.

In an embodiment, the stabilization transistor may be an N-type transistor.

In an embodiment, the stabilization transistor may include a control electrode which receives a power voltage, a first electrode connected to the gate signal control circuit and a second electrode connected to the pull-down circuit.

In an embodiment, wherein the power voltage may have a first voltage in an address period included in the first frame. In such an embodiment, the power voltage may have a second voltage lower than the first voltage in the self-scan period.

In an embodiment, the second voltage may be lower than the low voltage.

In an embodiment, an absolute value of the second voltage may be about twice an absolute value of the low voltage.

In an embodiment, the gate signal control circuit may include a first transistor including a control electrode which receives a clock signal, a first electrode which receives a previous stage gate signal or a vertical start signal and a second electrode connected to a first node, a second transistor including a control electrode connected to the first node, a first electrode which receives the high voltage and a second electrode connected to a second node, a third transistor including a control electrode which receives the low voltage, a first electrode connected to the first node and a second electrode connected to a third node, a fourth transistor including a control electrode connected to a fourth node, a first electrode which receives the low voltage and a second electrode connected to the second node.

In an embodiment, the pull-up circuit may include a fifth transistor including a control electrode connected to the second node, a first electrode which receives the high voltage and a second electrode connected to the output node. In such an embodiment, the pull-down circuit may include a sixth transistor including a control electrode connected to the fourth node, a first electrode which receives the low voltage and a second electrode connected to the output node.

In an embodiment, the stabilization transistor may include a control electrode which receives a power voltage, a first electrode connected to the third node and a second electrode connected to the fourth node.

In an embodiment, the first electrode of the first transistor may receive the vertical start signal.

According to embodiments, a display apparatus may comprise a display panel including a pixel, a gate driver which outputs a gate signal to the display panel, a data driver which applies a data voltage to the display panel. In such embodiments, the gate driver may include a plurality of stages. In such embodiments, a stage of the stages may include a pull-up circuit which applies a high voltage to an output node which outputs the gate signal, a pull-down circuit which applies a low voltage lower than the high voltage to the output node, a gate signal control circuit which controls the pull-up circuit and the pull-down circuit, and a stabilization transistor connected to the pull-down circuit. In such embodiments, the stabilization transistor is turned off during a blank period in which the data voltage is not applied to the pixel.

In an embodiment, the stabilization transistor may be an N-type transistor.

In an embodiment, the stabilization transistor may include a control electrode which receives a power voltage, a first electrode connected to the gate signal control circuit and a second electrode connected to the pull-down circuit.

In an embodiment, the power voltage may have a first voltage in an active period in which the data voltage is applied to the pixel. In such an embodiment, the power voltage may have a second voltage lower than the first voltage in the blank period.

In an embodiment, the second voltage may be lower than the low voltage.

According to embodiments, a gate driver includes a plurality of stages. In such embodiments, a stage of the stages includes a pull-up circuit which applies a high voltage to an output node which outputs a gate signal, a pull-down circuit which applies a low voltage lower than the high voltage to the output node, a gate signal control circuit which controls the pull-up circuit and the pull-down circuit, and a stabilization transistor connected to the pull-down circuit. In such embodiments, the stabilization transistor is turned off when the gate signal has the low voltage.

In an embodiment, the stabilization transistor may be an N-type transistor.

In an embodiment, the stabilization transistor may include a control electrode which receives a power voltage, a first electrode connected to the gate signal control circuit and a second electrode connected to the pull-down circuit.

In an embodiment, wherein the power voltage may have a first voltage in an address period during which the gate signal has a high voltage. In such an embodiment, the power voltage may have a second voltage lower than the high voltage in a self-scan period during which the gate signal has a low voltage.

In an embodiment, the second voltage may be lower than the low voltage.

As described above, according to embodiments of a gate driver and a display apparatus including the gate driver, a stage of a plurality of stages included in the gate driver may include a pull-down circuit and a stabilization transistor. In such embodiments, a power voltage applied to a control electrode of the stabilization transistor may be changed. The stabilization transistor may be connected to the pull-down circuit. The stabilization transistor may be turned off during a period in which the pull-down circuit operates, such that a leakage current applied to the pull-down circuit may be reduced. Accordingly, the pull-down circuit may operate stably, such that an output stability of the gate signal may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
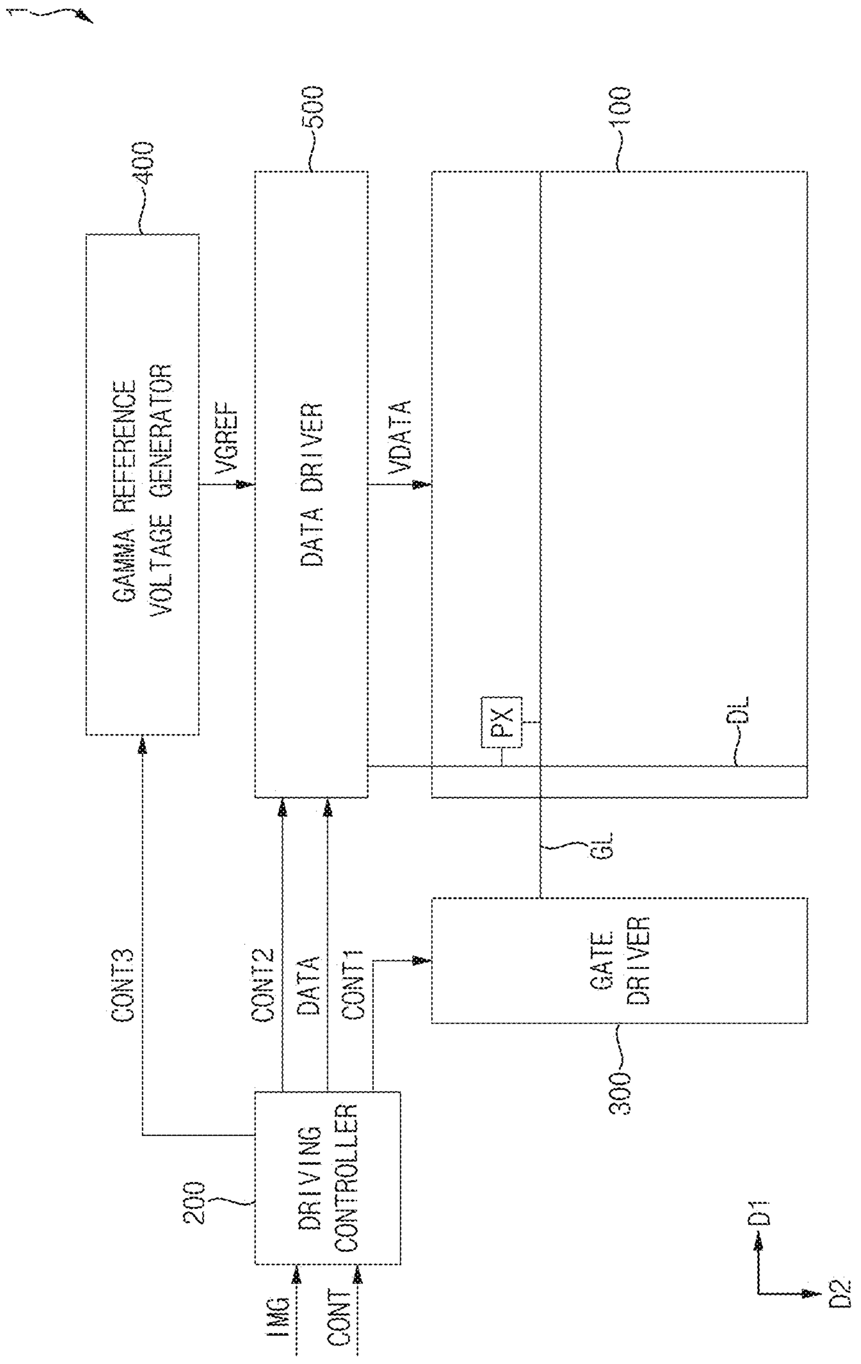
FIG. 1 is a block diagram illustrating a display apparatus according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display apparatus 1 according to embodiments of the invention.

Referring to FIG. 1, an embodiment of the display apparatus 1 includes a display panel 100 and a display panel driver. The display panel driver includes a driving controller 200, a gate driver 300, a gamma reference voltage generator 400 and a data driver 500.

The display panel 100 has a display region, on which an image is displayed, and a peripheral region adjacent to the display region.

The display panel 100 includes a plurality of gate lines GL, a plurality of data lines DL and a plurality of pixels PX electrically connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus. In an embodiment, for example, the input image data IMG may include red image data, green image data and blue image data. The input image data IMG may further include white image data. In another embodiment, for example, the input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal FLM of FIG. 2 and a gate clock signal. The gate clock signal may include a first clock signal CLK1 of FIG. 2 and a second clock signal CLK2 of FIG. 2.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

Figure 2:
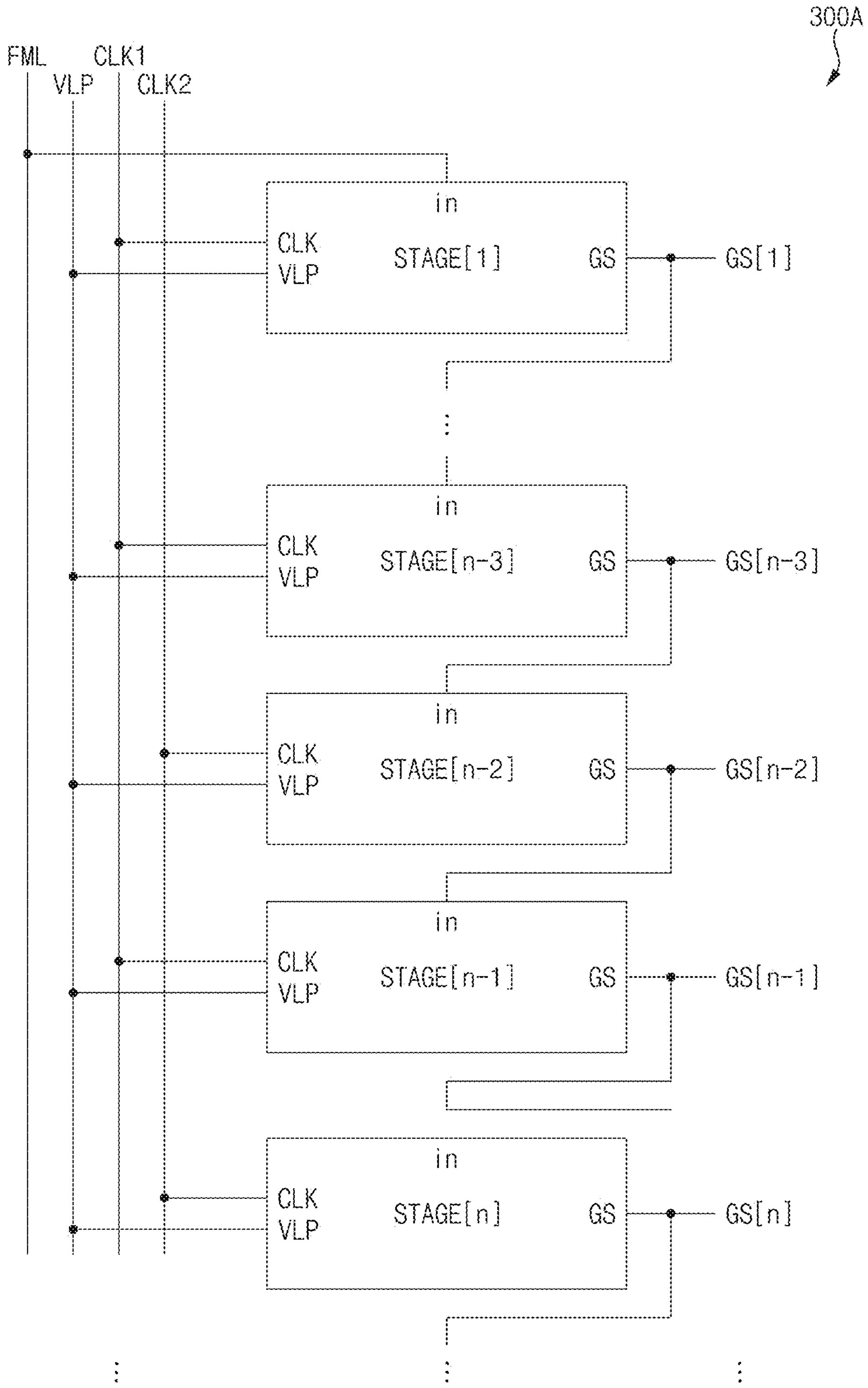
FIG. 2 is a block diagram illustrating an embodiment of a gate driver included in a display apparatus of FIG. 1.

The gate driver 300 generates gate signals GS[n] of FIG. 2 driving the gate lines GL in response to the first control signal CONT1 received from the driving controller 200. The gate driver 300 may output the gate signals GS[n] of FIG. 2 to the gate lines GL.

In an embodiment of the invention, the gate driver 300 may be integrated on the peripheral region of the display panel 100. In an embodiment of the invention, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the invention, the data driver 500 may be integrated on the peripheral region of the display panel 100. In an embodiment of the invention, the data driver 500 may be mounted on the peripheral region of the display panel 100.

FIG. 2 is a block diagram illustrating an embodiment of a gate driver 300 included in a display apparatus 1 of FIG. 1.

Referring to FIG. 1 and FIG. 2, an embodiment of a gate driver 300A may include a plurality of stages STAGE[1], . . . , STAGE[n−3], STAGE [n−2], STAGE[n−1] and STAGE [n].

In an embodiment, for example, the gate driver 300A may receive the vertical start signal FLM, the first clock signal CLK1, the second clock signal CLK2 and a power voltage VLP. The gate driver 300A may include the stages STAGE [1], . . . , STAGE[n−3], STAGE[n−2], STAGE[n−1] and STAGE[n] which sequentially output gate signals GS[1], . . . , GS[n−3], GS[n−2], GS[n−1] and GS[n] to the pixels PX as row-by-row.

The first clock signal CLK1 may be applied to odd numbered stages. The second clock signal CLK2 may be applied to even numbered stages. The vertical start signal FLM may be applied to a first stage STAGE[1]. A previous stage gate signal GS[n−1] of FIG. 3 may be applied to a current stage. The power voltage VLP may be applied to the stages STAGE[1], . . . , STAGE[n−3], STAGE[n−2], STAGE [n−1] and STAGE[n].

Figure 3:
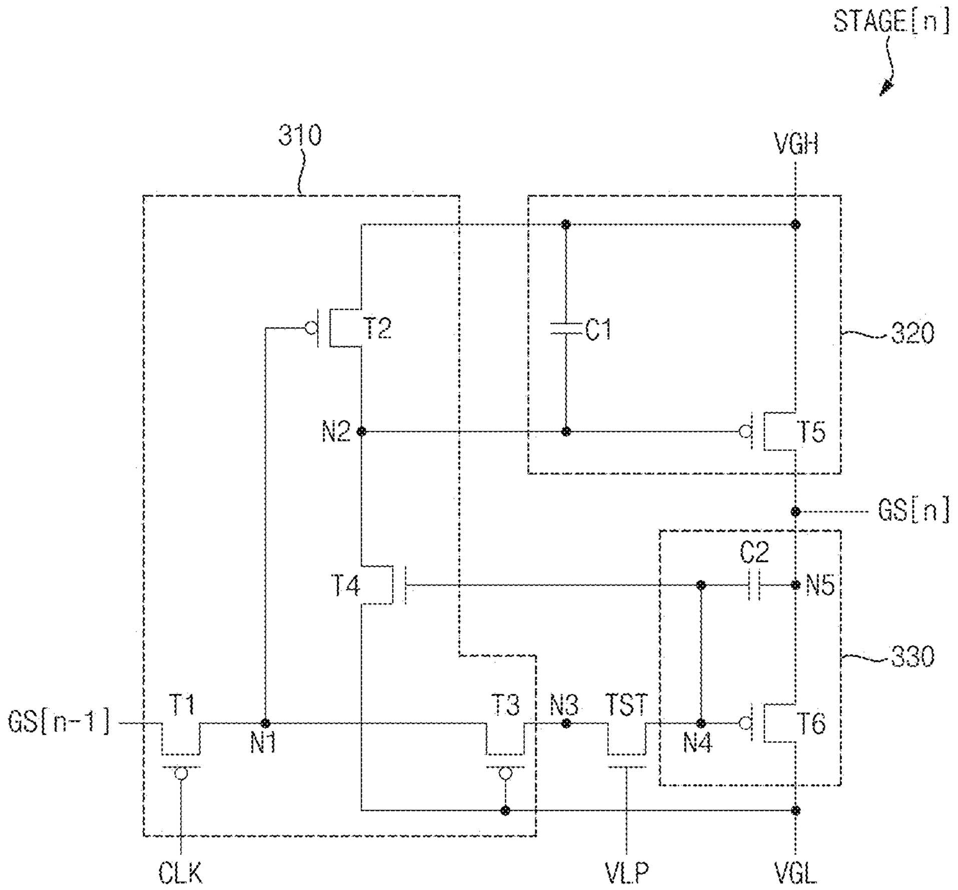
FIG. 3 is a circuit diagram illustrating an embodiment of a stage included in a gate driver of FIG. 2.

FIG. 3 is a circuit diagram illustrating an embodiment of a stage STAGE[n] included in a gate driver 300A of FIG. 2.

Referring to FIG. 1 to FIG. 3, an embodiment of the stage STAGE[n] may include a gate signal control circuit 310, a pull-up circuit 320, a pull-down circuit 330 and a stabilization transistor TST.

The gate signal control circuit 310 may include a first transistor T1, a second transistor T2, a third transistor T3 and a fourth transistor T4.

The first transistor T1 may include a control electrode that receives a clock signal CLK, a first electrode that receives the previous stage gate signal GS[n−1] and a second electrode connected to a first node N1. The first transistor T1 may apply the previous stage gate signal GS[n−1] to the first node N1 in response to the clock signal CLK. Here, the clock signal CLK may be one of the first clock signal CLK1 and the second clock signal CLK2 shown in FIG. 2.

The second transistor T2 may include a control electrode connected to the first node N1, a first electrode that receives a high voltage VGH and a second electrode connected to a second node N2. The second transistor T2 may apply the high voltage VGH to the second node N2 in response to a voltage of the first node N1.

The third transistor T3 may include a control electrode that receives a low voltage VGL, a first electrode connected to the first node N1 and a second electrode connected to a third node N3. The low voltage VGL may be lower than the high voltage VGH. The third transistor T3 may connect the first node N1 and the third node N3 to each other in response to the low voltage VGL. In an embodiment, for example, during a frame period during which the pixel PX is driven, a turn on state of the third transistor T3 may be maintained. In an embodiment, for example, the third transistor T3 may be always turned on.

The fourth transistor T4 may include a control electrode connected to a fourth node N4, a first electrode that receives the low voltage VGL and a second electrode connected to the second node N2. The fourth transistor T4 may apply the low voltage VGL to the second node N2 in response to a voltage of the fourth node N4.

The pull-up circuit 320 may include a fifth transistor T5 and a first capacitor C1.

The fifth transistor T4 may include a control electrode connected to the second node N2, a first electrode that receives the high voltage VGH and a second electrode connected to a fifth node N5. The fifth transistor T5 may apply the high voltage VGH to the fifth node N5 in response to a voltage of the second node N2. In such an embodiment, the fifth node N5 may be called as an output node.

The first capacitor C! may include a first electrode that receives the high voltage VGH and a second electrode connected to the second node N2. Through the first capacitor C1, an output stability of the fifth transistor T5 may be improved.

The pull-down circuit 330 may include a sixth transistor T6 and a second capacitor C2.

The sixth transistor T6 may include a control electrode connected to a fourth node N4, a first electrode that receives the low voltage VGL and a second electrode connected to the fifth node N5. The sixth transistor T6 may apply the low voltage VGL to the fifth node N5 in response a voltage of the fourth node N4.

The second capacitor C2 may include a first electrode connected to the fourth node N4 and a second electrode connected to the fifth node N5. Through the first capacitor C1, an output stability of the sixth transistor T6 may be improved.

In an embodiment, for example, the first to sixth transistors T1, T2, T3, T4, T5 and T6 may P-type transistors.

The stabilization transistor TST may include a control electrode that receives the power voltage VLP, a first electrode connected to the third node N3 and a second electrode connected to the fourth node N4. The stabilization transistor TST may connect the third node N3 and the fourth node N4 to each other in response to the power voltage VLP. When the sixth transistor T6 is turned on, the stabilization transistor TST may be turned off. In an embodiment, for example, in a self-scan period, the stabilization transistor TST may be turned off. In an embodiment, for example, in a blank period, the stabilization transistor TST may be turned off. In an embodiment, for example, the stabilization transistor TST may be an N-type transistor.

Figure 4:
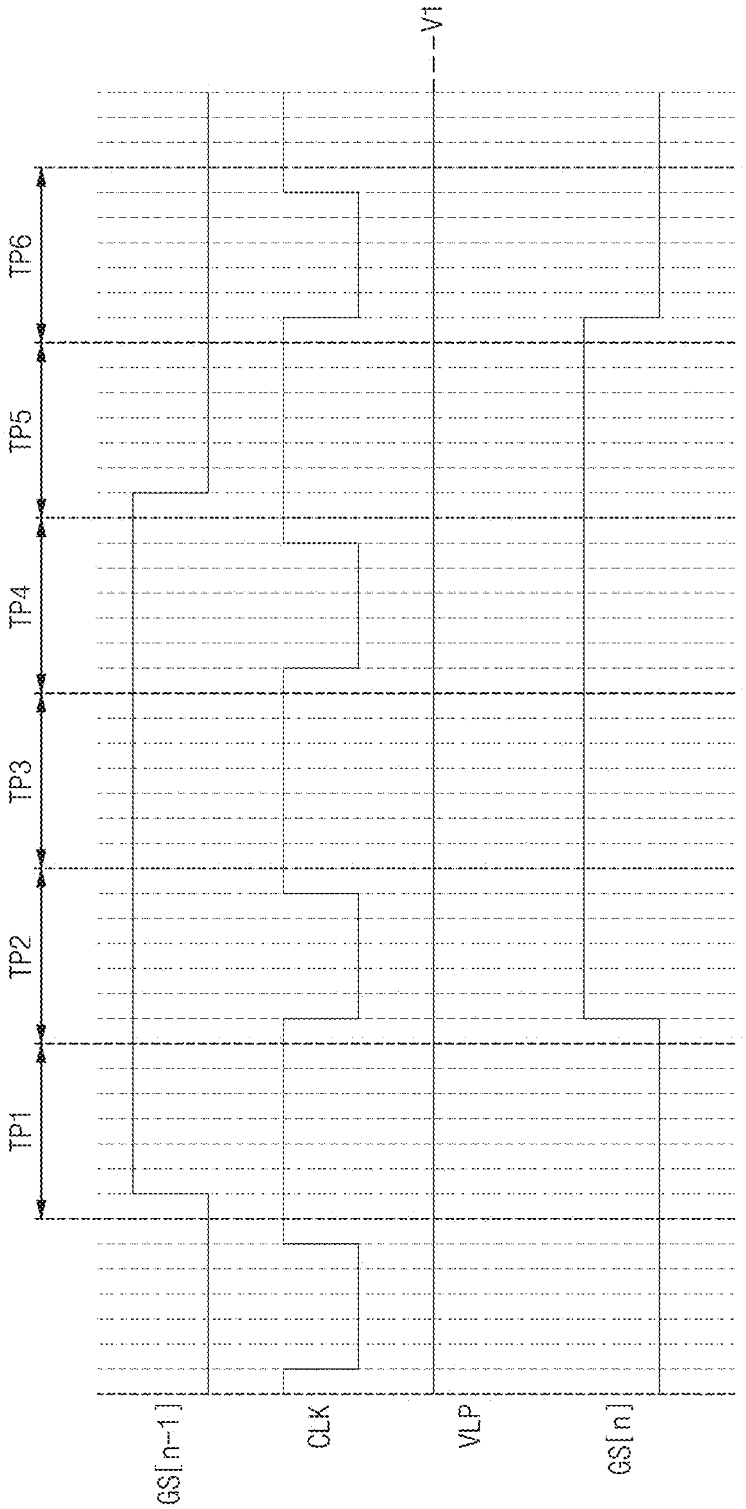
FIG. 4 is a signal timing diagram illustrating input signals and an output signal of stage of FIG. 3.

FIG. 4 is a signal timing diagram illustrating input signals and an output signal of stage STAGE[n] of FIG. 3.

Referring to FIG. 1 to FIG. 4, a period during which the gate signal GS[n] is outputted may include a first period TP1, a second period TP2, a third period TP3, a fourth period TP4, a fifth period TP5 and a sixth period TP6.

In the first period TP1, the previous stage gate signal GS[n−1] may have an activation level, the clock signal CLK may have a clock high level, the power voltage VLP may have a first voltage V1. In an embodiment, for example, the activation level of the previous stage gate signal GS[n−1] and the gate signal GS[n] may be a high level. In an embodiment, for example, the inactivation level of the previous stage gate signal GS[n−1] and the gate signal GS[n] may be a low level. The high level may be higher than the low level. The first voltage V1 may be a voltage that turns on the stabilization transistor TST.

In the first period TP1, the first transistor T1 may be turned off in response to the clock signal CLK. The first transistor T1 may be turned off, such that the previous stage gate signal GS[n−1] may not be applied to the first node N1.

In the second period TP2, the previous stage gate signal GS[n−1] may have an activation level, the clock signal CLK may have a clock low level, the power voltage VLP may have the first voltage V1. The clock low level of the clock signal CLK may be lower than the clock high level of the clock signal CLK.

In the second period TP2, the first transistor T1 may be turned on in response to the clock signal CLK. The first transistor T1 may be turned on, such that the previous stage gate signal GS[n−1] may be applied to the first node N1. In the second period TP2, a voltage of the first node N1 may be in the high level. Accordingly, the second transistor T2 may be turned off. In the second period TP2, the third transistor T3 may be turned on in response to the low voltage VGL. Accordingly, the first node N1 and the third node N3 may be connected to each other. The first node N1 and the third node N3 may be connected to each other, such that the previous stage gate signal GS[n−1] may be applied to the third node N3. The stabilization transistor TST may be turned on in response to the power voltage VLP having the first voltage V1. The stabilization transistor TST may be turned on, such that the third node N3 and the fourth node N4 may be connected to each other. The third node N3 and the fourth node N4 may be connected to each other, the previous stage gate signal GS[n−1] may be applied to the fourth node N4. The sixth transistor T6 may be turned off in response to a voltage of the fourth node N4. The fourth transistor T4 may be turned off in response to the voltage of the fourth node N4. The fourth transistor T4 may be turned on, such that the low voltage VGL may be applied to the second node N2. The fifth transistor T5 may be turned on in response to a voltage of the second node N2. The fifth transistor T5 may be turned on, such that the high voltage VGH may be applied to the fifth node N5. Accordingly, the gate signal GS[n] may have the high voltage VGH. In an embodiment, for example, in the second period TP2, the gate signal GS[n] may have the activation level.

In the third period TP3, the previous stage gate signal GS[n−1] may have an activation level, the clock signal CLK may have the clock high level, the power voltage VLP may have the first voltage V1. In the third period TP3, the gate signal GS[n] may have the activation level.

In the fourth period TP4, the previous stage gate signal GS[n−1] may have an activation level, the clock signal CLK may have the clock low level, the power voltage VLP may have the first voltage V1. In the fourth period TP4, the gate signal GS[n] may have the activation level.

In the fifth period TP5, the previous stage gate signal GS[n−1] may have an inactivation level, the clock signal CLK may have the clock high level, the power voltage VLP may have the first voltage V1.

In the fifth period TP5, the clock signal CLK may have the clock high level. The first transistor T1 may be turned off in response to the clock signal CLK having the clock high level. Accordingly, the previous stage gate signal GS[n−1] may not be applied to the first node N1. In the fifth period TP5, the gate signal GS[n] may have the activation level.

In the sixth period TP6, the previous stage gate signal GS[n−1] may have the inactivation level, the clock signal CLK may have the clock low level, the power voltage VLP may have the first voltage V1.

In the sixth period TP6, the first transistor T1 may be turned off in response to the clock signal CLK having the clock low level. The first transistor T1 may be turned on, such that the previous stage gate signal GS[n−1] having the inactivation level may be applied to the first node N1. A voltage of the first node N1 may be in the low level. In the sixth period TP6, the second transistor T2 may be turned on in response to the voltage of the first node N1. The second transistor T2 may be turned on, such that the high voltage VGH may be applied to the second node N2. The fifth transistor T5 may be turned off in response to a voltage of the second node N2. The third transistor T3 may be turned on in response to the low voltage VGL. The third transistor T3 may be turned on, such that the first node N1 and the third node N4 may be connected to each other. The stabilization transistor TST may be turned on in response to the power voltage VLP having the first voltage V1. The stabilization transistor TST may be turned on, such that the third node N3 and the fourth node N4 may be connected to each other. Accordingly, the previous stage gate signal GS[n−1] having the inactivation level may be applied to the fourth node N4. A voltage of the fourth node N4 may be in the low level. The fourth transistor T4 may be turned off in response to the voltage of the fourth node N4. The sixth transistor T6 may be turned on in response to the voltage of the fourth node N4. The sixth transistor T6 may be turned on, such that the low voltage VGL may be applied to the fifth node N5. Accordingly, the gate signal GS[n] may have the low voltage VGL. In an embodiment, for example, in the sixth period TP6, the gate signal GS[n] may have the inactivation level.

Figure 5:
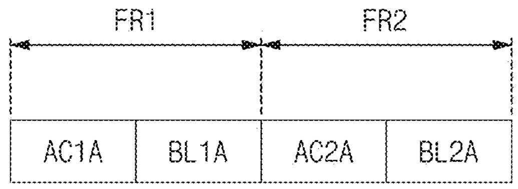
FIG. 5 is a conceptual diagram illustrating a driving frame of a display panel included in a display apparatus of FIG. 1.
Figure 6:
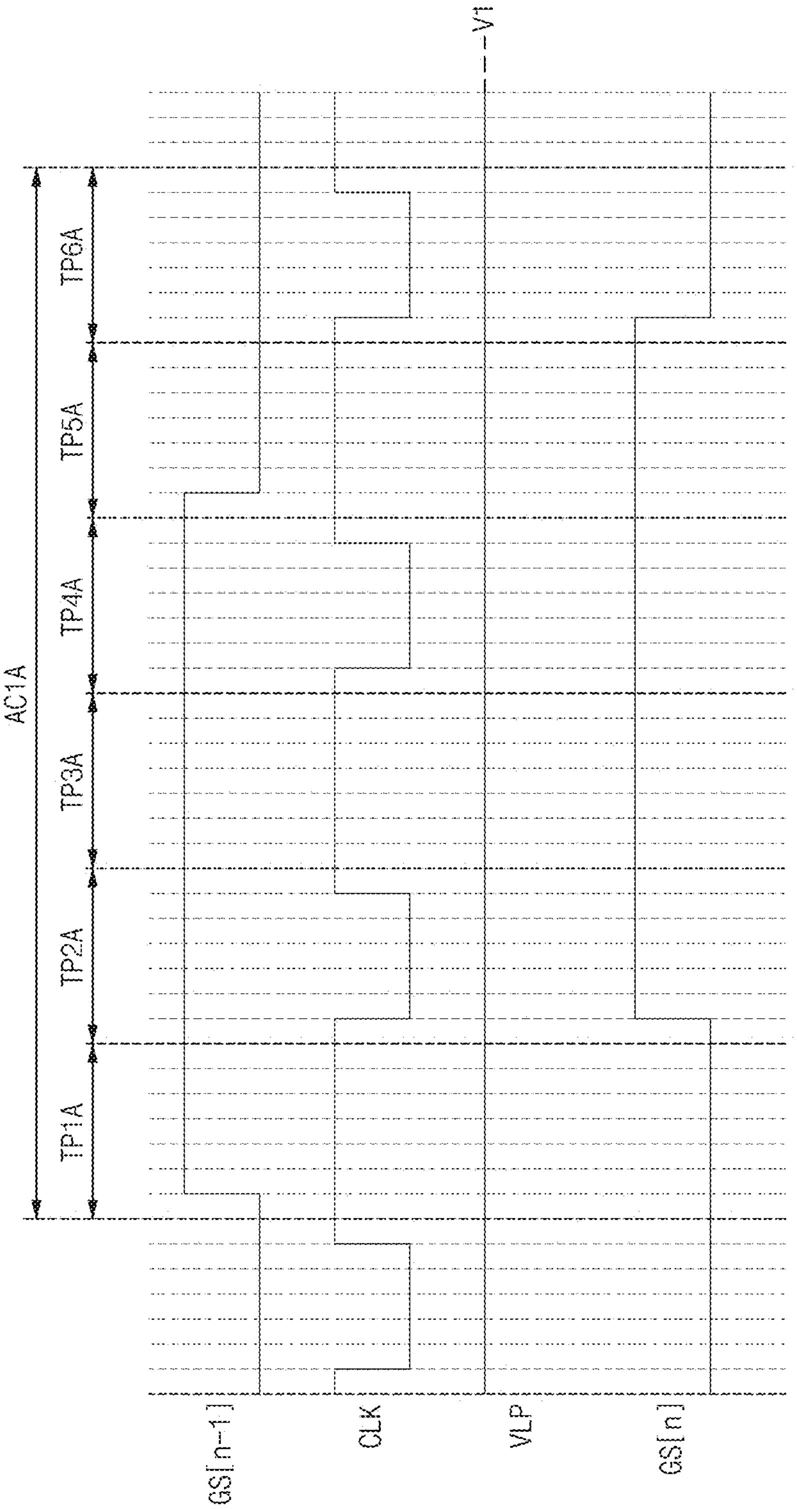
FIG. 6 is a signal timing diagram illustrating an input signal and an output signal of a stage of FIG. 3 in a first active period of FIG. 5.
Figure 7:
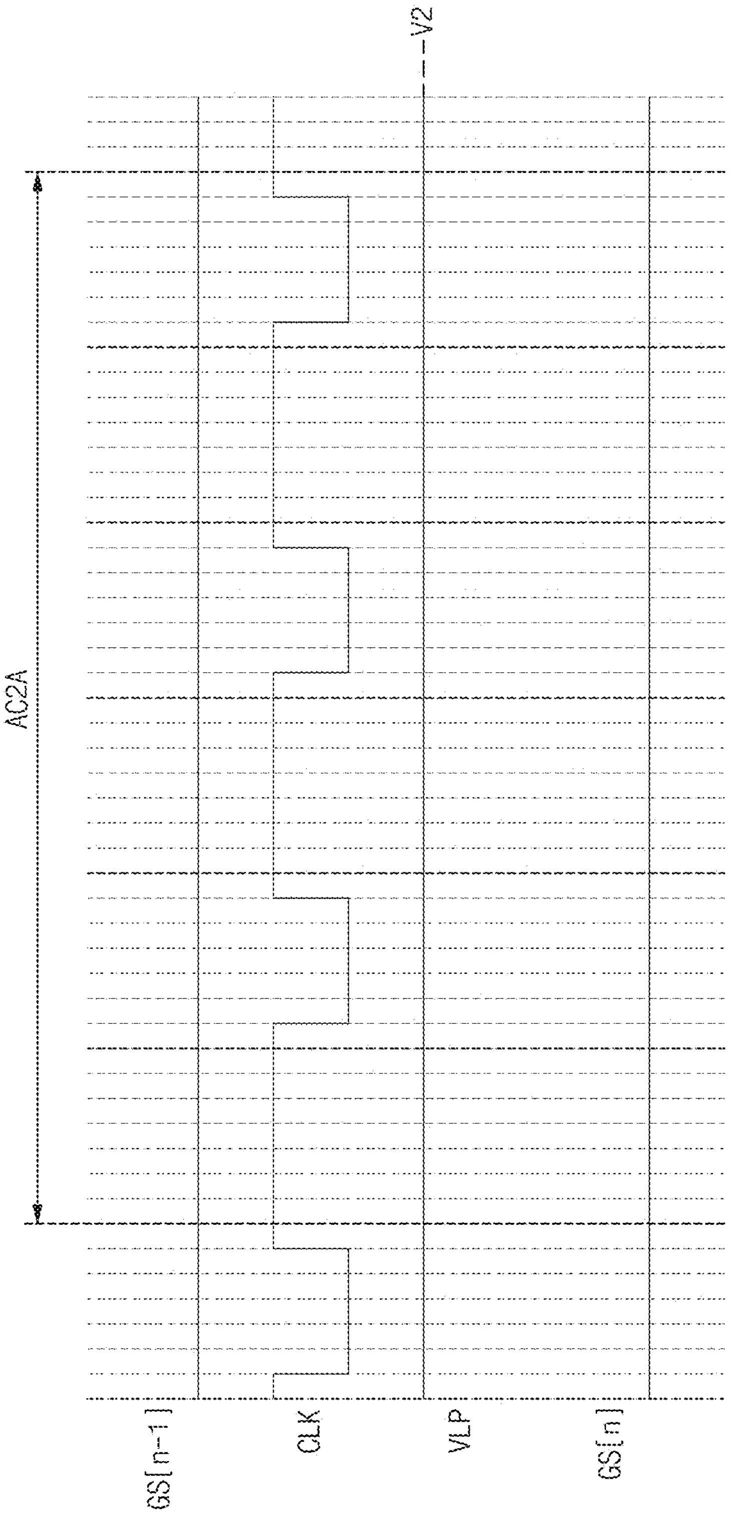
FIG. 7 is a signal timing diagram illustrating an input signal and an output signal of a stage of FIG. 3 in a second active period of FIG. 5.
Figure 8:
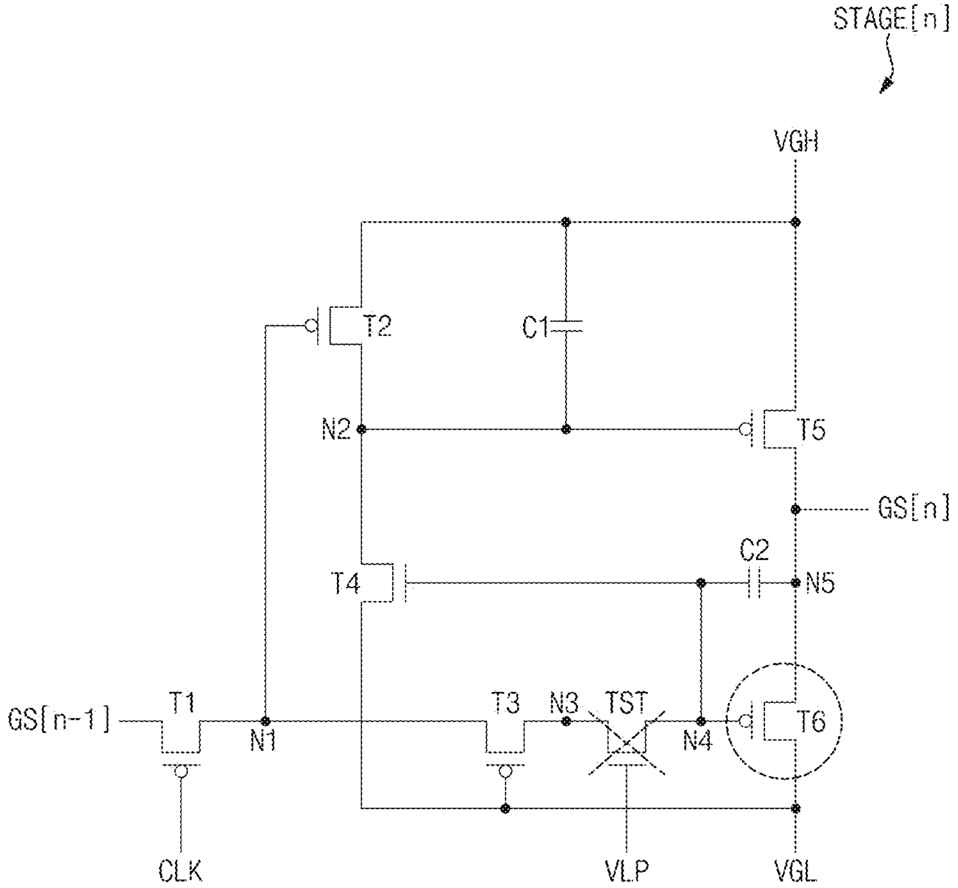
FIG. 8 is a circuit diagram illustrating an operation of a stage of FIG. 3 in a second active period of FIG. 5.

FIG. 5 is a conceptual diagram illustrating a driving frame of a display panel 100 included in a display apparatus 1 of FIG. 1. FIG. 6 is a signal timing diagram illustrating an input signal and an output signal of a stage STAGE[n] of FIG. 3 in a first active period AC1A of FIG. 5. FIG. 7 is a signal timing diagram illustrating an input signal and an output signal of a stage STAGE[n] of FIG. 3 in a second active period AC2A of FIG. 5. FIG. 8 is a circuit diagram illustrating an operation of a stage STAGE[n] of FIG. 3 in a second active period AC2A of FIG. 5.

Referring to FIG. 1 to FIG. 8, a frame during which the display panel 100 is driven may include a first frame FR1 and a second frame FR2. The first frame FR1 may include a first active period AC1A and a first blank period BL1A. The second frame FR2 following the first frame FR1 may include a second active period AC2A and a second blank period BL2A.

In an embodiment, for example, the first active period AC1A may include a first period TP1A, a second period TP2A, a third period TP3A, a fourth period TP4A, a fifth period TP5A and a sixth period TP6A.

A driving of the stage STAGE[n] in the first active period AC1A shown in FIGS. 5 to 8 is substantially the same as the driving in the embodiment described above with referring to FIG. 1 to FIG. 4. Accordingly, the same reference numerals will be used to refer to the same or like elements as those described above, and any repetitive detailed description thereof will be omitted.

In an embodiment, for example, the first active period AC1A may be an address period. The address period may be a period that the data voltage VDATA is applied to the pixel PX. In the first active period AC1A, the power voltage VLP may have the first voltage V1.

In the second active period AC2A, the previous stage gate signal GS[n−1] may have the inactivation level. In an embodiment, for example, in the second active period AC2A, the vertical start signal FLM may have an inactivation level. Accordingly, in the second active period AC2A, the gate signal GS[n] may have the inactivation level. In the second active period AC2A, the gate signal GS[n] may have the inactivation level, such that the data voltage VDATA may not be applied to the pixel PX. Accordingly, in the second frame FR2, the pixel PX may emit light based on the data voltage VDATA of the first frame FR1. In an embodiment, for example, the second active period AC2A may be the self-scan period.

In an embodiment, in the second active period AC2A, the power voltage VLP may have a second voltage V2 lower than the first voltage V1. The second voltage V2 may be lower than the low voltage VGL. In an embodiment, for example, an absolute value of the second voltage V2 may be twice absolute value of the low voltage VGL. In an embodiment, for example, the second voltage V2 may be lower than a threshold voltage of the stabilization transistor TST. The second active period AC2A, the stabilization transistor TST may be turned off. In an embodiment, for example, in the second active period AC2A, the stabilization TST may be strongly or effectively turned off. Accordingly, a leakage current may not be applied to the fourth node N4. In such an embodiment, the leakage current may not be applied to the fourth node N4, such that a turn on state of the sixth transistor T6 may be maintained. In such an embodiment, the turn on state of the sixth transistor T6 may be maintained, such that the low voltage VGL may be applied to the fifth node N5 stably. Accordingly, an output stability of the gate signal GS[n] may be improved. The output stability of the gate signal GS[n] may be improved, such that a driving reliability and an emission reliability of the pixel PX may be improved.

In an embodiment, the stabilization transistor TST may be an N-type transistor. In such an embodiment, the stabilization transistor TST may be the N-type transistor, such that a leakage current flowing through the stabilization transistor TST may be reduced. Accordingly, leakage current applied to the fourth node N4 may be further reduced.

Figure 9:
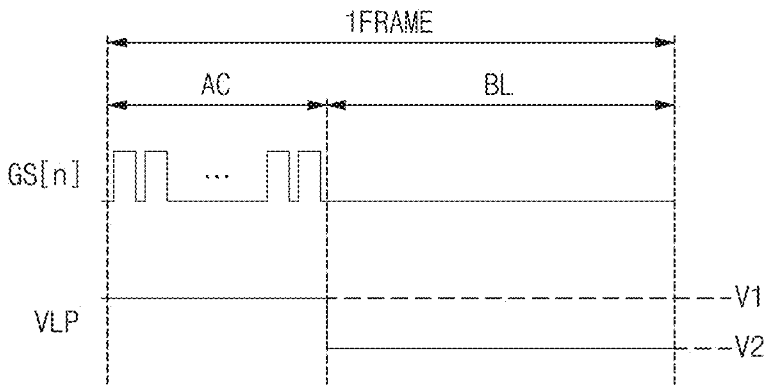
FIG. 9 is a signal timing diagram illustrating an embodiment of an input signal and an output signal of a stage of FIG. 3 in an active period and a blank period of a frame period.

FIG. 9 is a signal timing diagram illustrating an embodiment of an input signal and an output signal of a stage STAGE[n] of FIG. 3 in an active period AC and a blank period BL of a frame period.

Referring to FIG. 1, FIG. 3 and FIG. 9, a frame period IFRAME during which the pixel PX is driven may include an active period AC and a blank period BL. In the active period AC, the gate signal GS[n] may have an activation level. The gate signal GS[n] may have an activation level, such that the data voltage VDATA may be applied to the pixel PX in the active period AC. In the blank period BL, the gate signal GS[n] may have an inactivation level. The gate signal GS[n] may have an inactivation level in the blank period BL, such that the data voltage VDATA may not be applied to the pixel PX in the blank period BL.

In an embodiment, in the active period AC, the power voltage VLP may have the first voltage V1. In the blank period BL, the power voltage VLP may be changed from the first voltage V1 to the second voltage V2. In an embodiment, for example, in the blank period BL, the power voltage VLP may have the second voltage V2 lower than the first voltage V1. The second voltage V2 may be lower than the low voltage VGL. In an embodiment, for example, an absolute value of the second voltage V2 may be about twice an absolute value of the low voltage VGL. In an embodiment, for example, the second voltage V2 may be lower than a threshold voltage of the stabilization transistor TST. Accordingly, the stabilization transistor TST may be turned off in the blank period BL. In an embodiment, for example, the stabilization transistor TST may be strongly or effectively turned off in the blank period BL. Accordingly, a leakage current may not be applied to the fourth node N4 in the blank period BL. In such an embodiment, a leakage current may not be applied to the fourth node N4 in the blank period BL, such that a turn on state of the sixth transistor T6 may be maintained. In such an embodiment, the turn on state of the sixth transistor T6 may be maintained in the blank period BL, such that the low voltage VGL may be applied to the fifth node N5 stably. Accordingly, an output stability of the gate signal GS[n] may be improved, such that a driving reliability and an emission reliability of the pixel PX may be improved.

Figure 10:
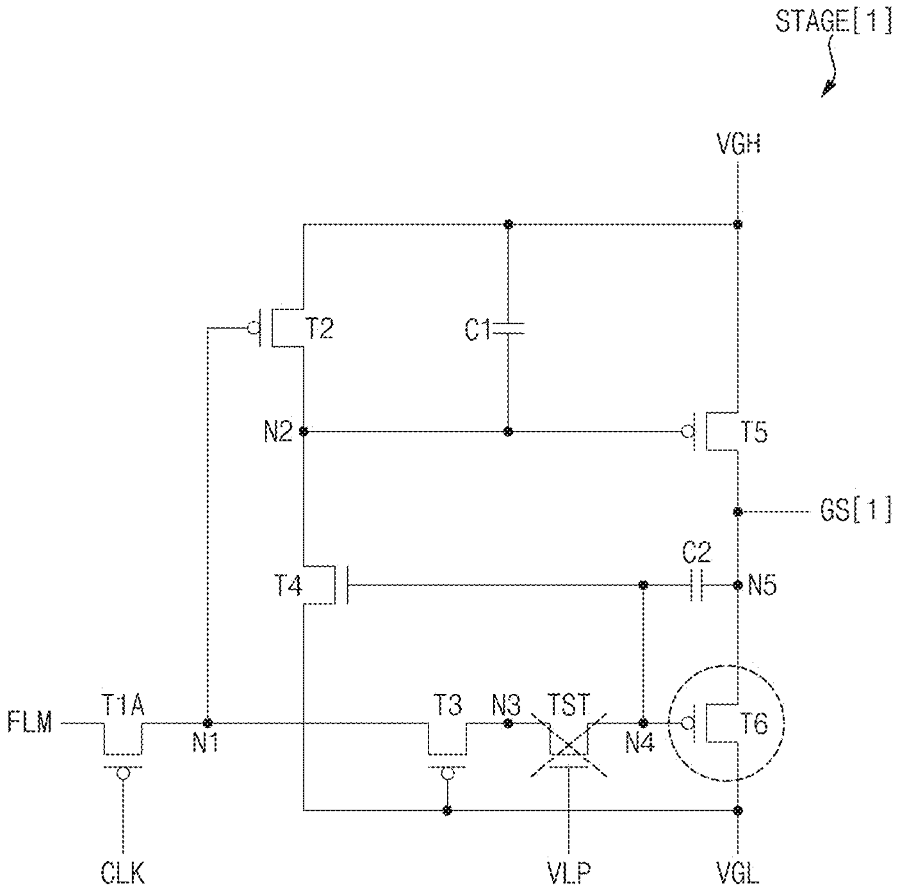
FIG. 10 is a circuit diagram illustrating an embodiment of a first stage included in a gate driver of FIG. 2.

FIG. 10 is a circuit diagram illustrating an embodiment of a first stage STAGE[1] included in a gate driver 300A of FIG. 2.

Referring to FIG. 10, a first stage STAGE[1] may include a first transistor T1A, the second transistor T2, the third transistor T3, the fourth transistor T4, the fifth transistor T5, the sixth transistor T6, the stabilization transistor TST, the first capacitor C1 and the second capacitor C2.

A driving of the first stage STAGE[1] shown in FIG. 10 is substantially the same as the driving of the embodiment described above with referring to FIG. 1 to FIG. 4. Accordingly, the same reference numerals will be used to refer to the same or like elements as those described above, and any repetitive detailed description thereof will be omitted.

In an embodiment, the first transistor T1A may receive the vertical start signal FLM. The first stage STAGE[1] may output a first gate signal GS[1] based on the vertical start signal FLM.

Figure 11:
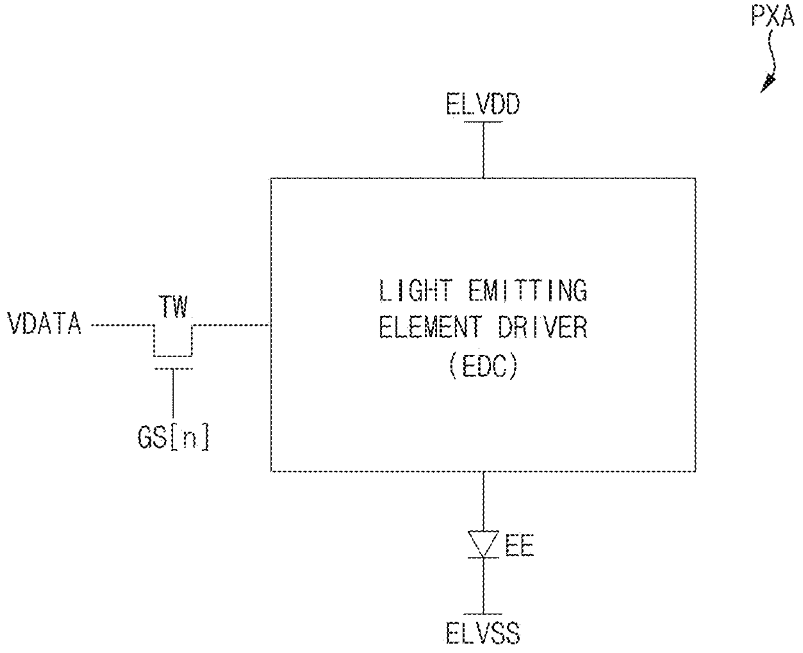
FIG. 11 is a circuit diagram illustrating an embodiment of a pixel included in a display apparatus of FIG. 1.

FIG. 11 is a circuit diagram illustrating an embodiment of a pixel PX included in a display apparatus 1 of FIG. 1.

Referring to FIG. 1, FIG. 3 and FIG. 11, an embodiment of a pixel PXA may include a light emitting element driver EDC, a write transistor TW and a light emitting element EE.

The light emitting element driver EDC may generated a driving current based on the data voltage VDATA. The light emitting element driver EDC may apply the driving current to the light emitting element EE. The light emitting element driver EDC may receive a first emission power voltage ELVDD.

The write transistor TW may include a control electrode that receives the gate signal GS[n], a first electrode that receives the data voltage VDATA and a second electrode connected to the light emitting element driver EDC. The write transistor TW may apply the data voltage VDATA to the light emitting element driver EDC in response to the gate signal GS[n]. In an embodiment, for example, the write transistor TW may be an N-type transistor.

The light emitting element EE may include a first electrode connected to the light emitting element driver EDC and a second electrode that receives a second emission power voltage ELVSS. The second emission power volage ELVSS may be lower than the first emission power voltage ELVDD. The light emitting element EE may emit light based on the driving current. In an embodiment, for example, the light emitting element EE may be an emitting diode.

Figure 12:
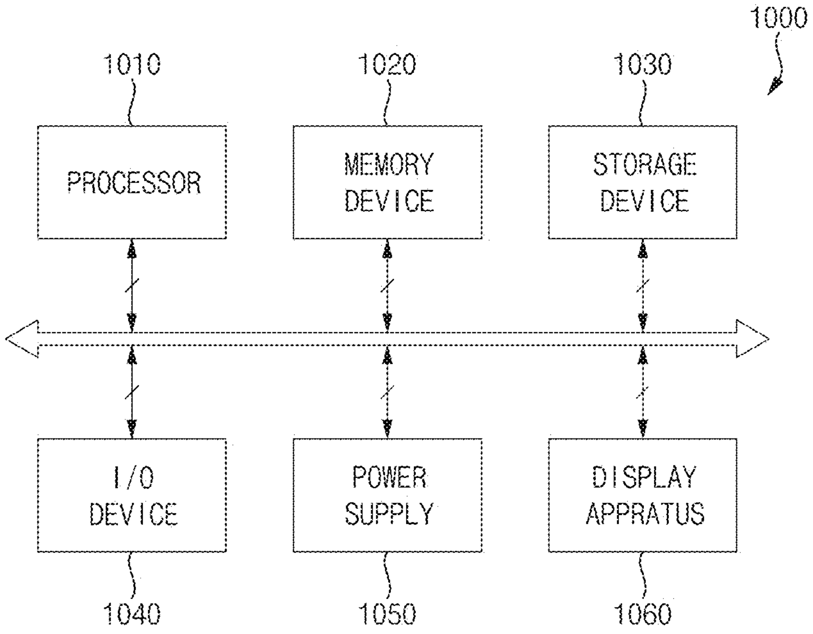
FIG. 12 is a block diagram illustrating an electronic device according to an embodiment of the invention.
Figure 13:
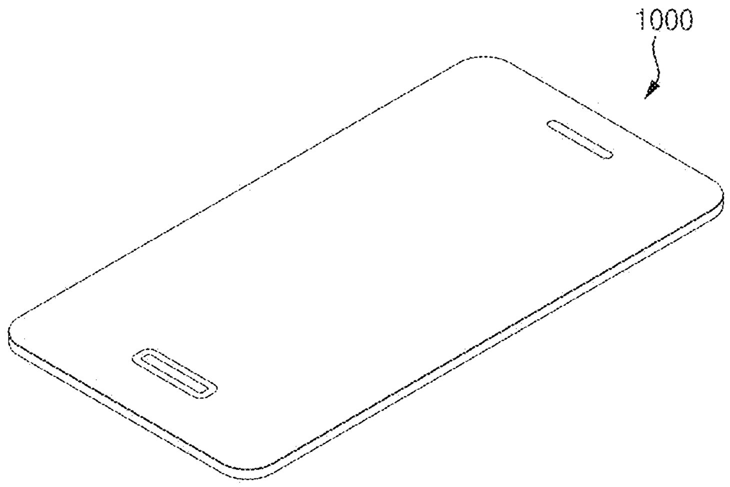
FIG. 13 is a diagram illustrating an embodiment in which the electronic device of FIG. 12 is implemented as a smart phone.

FIG. 12 is a block diagram illustrating an electronic device 1000 according to an embodiment of the invention. FIG. 13 is a diagram illustrating an example in which the electronic device of FIG. 12 is implemented as a smart phone.

Referring to FIG. 12, an embodiment of the electronic device 1000 may include a processor 1010, a memory device 1020, a storage device 1030, an input/output (I/O) device 1040, a power supply 1050, and a display apparatus 1060. Here, the display apparatus 1060 may correspond to the display apparatus of FIG. 1. Additionally, the electronic device 1000 may further include a plurality of ports for communicating with a video card, a sound card, a memory card, a universal serial bus (USB) device, another electronic device, etc.

In an embodiment, as illustrated in FIG. 13, the electronic device 1000 may be implemented as a smart phone. However, the electronic device 1000 is not limited thereto. In an embodiment, for example, the electronic device 1000 may be implemented as a cellular phone, a video phone, a smart pad, a smart watch, a tablet computer, a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic device 1000. The display apparatus 1060 may be coupled to other components via the buses or other communication links.

Referring to FIG. 13, an embodiment of the electronic device may be implemented as a smartphone, but the invention is not limited thereto. The electronic device may be a television, a monitor, a laptop computer, or a tablet. Additionally, the electronic device may be a car.

The display apparatus according to an embodiments may be applied to a display apparatus included in a computer, a notebook, a mobile phone, a smart phone, a smart pad, a portable media player (PMP), a personal digital assistant (PDA), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:
- a display panel including a pixel;
- a gate driver which outputs a gate signal to the display panel; and
- a data driver which applies a data voltage to the display panel,
- wherein the gate driver includes a plurality of stages,
- wherein a stage of the stages includes:
  - a pull-up circuit which applies a high voltage to an output node which outputs the gate signal;
  - a pull-down circuit which applies a low voltage lower than the high voltage to the output node;
  - a gate signal control circuit which controls the pull-up circuit and the pull-down circuit; and
  - a stabilization transistor connected to the pull-down circuit,
- wherein the pixel emits light based on the data voltage of a current frame during a first frame and emits light based on the data voltage of a previous frame during a second frame,
- wherein the stabilization transistor is turned off during a self-scan period included in the second frame and a control electrode of the stabilization transistor receives a power voltage that has a first voltage in an address period included in the first frame and a second voltage in the self-scan period, wherein the second voltage is lower than the low voltage, and
- wherein the gate signal control circuit includes:
- a first transistor including a control electrode which receives a clock signal, a first electrode which receives a previous stage gate signal or a vertical start signal and a second electrode connected to a first node;
- a second transistor including a control electrode connected to the first node, a first electrode which receives the high voltage and a second electrode connected to a second node;
- a third transistor including a control electrode which receives the low voltage, a first electrode connected to the first node and a second electrode connected to a third node;
- a fourth transistor including a control electrode connected to a fourth node, a first electrode which receives the low voltage and a second electrode connected to the second node.

2. The display apparatus of claim 1, wherein the stabilization transistor is an N-type transistor.

3. The display apparatus of claim 1, wherein the stabilization transistor includes a control electrode which receives a power voltage, a first electrode connected to the gate signal control circuit and a second electrode connected to the pull-down circuit.

4. The display apparatus of claim 1, wherein an absolute value of the second voltage is about twice an absolute value of the low voltage.

5. The display apparatus of claim 1, wherein the pull-up circuit includes a fifth transistor including a control electrode connected to the second node, a first electrode which receives the high voltage and a second electrode connected to the output node, and
- wherein the pull-down circuit includes a sixth transistor including a control electrode connected to the fourth node, a first electrode which receives the low voltage and a second electrode connected to the output node.

6. The display apparatus of claim 5, wherein the stabilization transistor includes a control electrode which receives a power voltage, a first electrode connected to the third node and a second electrode connected to the fourth node.

7. The display apparatus of claim 1, wherein the first electrode of the first transistor receives the vertical start signal.

8. A display apparatus comprising:
- a display panel including a pixel;
- a gate driver which outputs a gate signal to the display panel; and
- a data driver which applies a data voltage to the display panel,
- wherein the gate driver includes a plurality of stages,
- wherein a stage of the stages includes:
  - a pull-up circuit which applies a high voltage to an output node which outputs the gate signal;
  - a pull-down circuit which applies a low voltage lower than the high voltage to the output node;
  - a gate signal control circuit which controls the pull-up circuit and the pull-down circuit; and
  - a stabilization transistor connected to the pull-down circuit,
- wherein the stabilization transistor is turned off during a blank period in which the data voltage is not applied to the pixel, and a control electrode of the stabilization transistor receives a power voltage that has a first voltage in an address period included in the first frame and a second voltage in the self-scan period, wherein the second voltage is lower than the low voltage, and wherein the gate signal control circuit includes:

a first transistor including a control electrode which receives a clock signal, a first electrode which receives a previous stage gate signal or a vertical start signal and a second electrode connected to a first node;

a second transistor including a control electrode connected to the first node, a first electrode which receives the high voltage and a second electrode connected to a second node;

a third transistor including a control electrode which receives the low voltage, a first electrode connected to the first node and a second electrode connected to a third node;

a fourth transistor including a control electrode connected to a fourth node, a first electrode which receives the low voltage and a second electrode connected to the second node.

9. The display apparatus of claim 8, wherein the stabilization transistor is an N-type transistor.

10. The display apparatus of claim 8, wherein the stabilization transistor includes a control electrode which receives a power voltage, a first electrode connected to the gate signal control circuit and a second electrode connected to the pull-down circuit.

11. A gate driver comprising:

a plurality of stages, wherein a stage of the stages includes, a pull-up circuit which applies a high voltage to an output node which outputs a gate signal;

a pull-down circuit which applies a low voltage lower than the high voltage to the output node;

a gate signal control circuit which controls the pull-up circuit and the pull-down circuit; and a stabilization transistor connected to the pull-down circuit, wherein the stabilization transistor is turned off when the gate signal has the low voltage, and a control electrode of the stabilization transistor receives a power voltage that has a first voltage in an address period included in the first frame and a second voltage in the self-scan period, wherein the second voltage is lower than the low voltage, and wherein the gate signal control circuit includes:

a first transistor including a control electrode which receives a clock signal, a first electrode which receives a previous stage gate signal or a vertical start signal and a second electrode connected to a first node;

a second transistor including a control electrode connected to the first node, a first electrode which receives the high voltage and a second electrode connected to a second node;

a third transistor including a control electrode which receives the low voltage, a first electrode connected to the first node and a second electrode connected to a third node;

a fourth transistor including a control electrode connected to a fourth node, a first electrode which receives the low voltage and a second electrode connected to the second node.

12. The gate driver of claim 11, wherein the stabilization transistor is an N-type transistor.

13. The gate driver of claim 11, wherein the stabilization transistor includes a control electrode which receives a power voltage, a first electrode connected to the gate signal control circuit and a second electrode connected to the pull-down circuit.

14. An electronic apparatus comprising:

a display panel including a pixel;

a gate driver which outputs a gate signal to the display panel;

a data driver which applies a data voltage to the display panel;

a driving controller which controls the gate driver and the data driver based on an input control signal; and a processor which outputs the input control signal, wherein the gate driver includes a plurality of stages, wherein a stage of the stages includes:

a pull-up circuit which applies a high voltage to an output node which outputs the gate signal;

a pull-down circuit which applies a low voltage lower than the high voltage to the output node;

a gate signal control circuit which controls the pull-up circuit and the pull-down circuit; and a stabilization transistor connected to the pull-down circuit, wherein the pixel emits light based on the data voltage of a current frame during a first frame and emits light based on the data voltage of a previous frame during a second frame, wherein the stabilization transistor is turned off during a self-scan period included in the second frame, and a control electrode of the stabilization transistor receives a power voltage that has a first voltage in an address period included in the first frame and a second voltage in the self-scan period, wherein the second voltage is lower than the low voltage, and wherein the gate signal control circuit includes:

a first transistor including a control electrode which receives a clock signal, a first electrode which receives a previous stage gate signal or a vertical start signal and a second electrode connected to a first node;

a second transistor including a control electrode connected to the first node, a first electrode which receives the high voltage and a second electrode connected to a second node;

a third transistor including a control electrode which receives the low voltage, a first electrode connected to the first node and a second electrode connected to a third node;

a fourth transistor including a control electrode connected to a fourth node, a first electrode which receives the low voltage and a second electrode connected to the second node.

* * * * *